Patented Nov. 30, 1937

2,100,692

UNITED STATES PATENT OFFICE 2,100,692

PROCESS OF VULCANIZING RUBBER AND PRODUCT PRODUCED THEREBY

Marion W. Harman, Nitro, W. Va., assignor, by mesne assignments, to Monsanto Chemical Company, Wilmington, Del., a corporation of Delaware No Drawing. Application April 11, 1933
Serial No. 665,568

12 Claims. (Cl. 18—53)

The present invention relates to the art of rubber manufacture and particularly relates to a new class of rubber vulcanization accelerators for use in the vulcanization of rubber and rubberlike products.

The new and preferred class of rubber vulcanization accelerators comprises the reaction products of an isocyclic saturated organic base and members of a class of organic compounds possessing the grouping

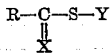

wherein R is nitrogen, carbon or sulfur, X is sulfur or nitrogen and Y is sulfur or the acidic hydrogen atom of a mercaptothiazole. When R is sulfur X preferably is nitrogen and when R is nitrogen X preferably is sulfur. R and X may or may not be parts of a ring.

As examples of the above class of compounds wherein R is carbon, X is sulfur and Y is sulfur are the compounds dithio benzoic acid disulfide and dithio salicylic acid disulfide. As examples of the above class of compounds wherein R is nitrogen, X is sulfur and Y is sulfur are the compounds tetramethyl thiuram disulfide, tetraethyl thiuram disulfide and tetramethyl thiuram polysulfide. As examples of the above class of compounds wherein R is sulfur, X is nitrogen and Y is the acidic hydrogen atom of a mercaptothiazole are the compounds mercapto-benzo-thiazole, mercapto-tolyl-thiazole and mercapto-naphtha-thiazole. As examples of the above class of compounds wherein R is sulfur, X is nitrogen and Y is sulfur are di[benzo-thiazyl]-disulfide and polysulfide. In mercapto-benzo-thiazole, mercapto-tolyl-thiazole, mercapto-naphtha-thiazole, di[benzo-thiazyl]-disulfide and di[benzo-thiazyl] polysulfide R and X are part of a ring.

Examples of isocyclic bases that are reactive with the organic compounds hereinbefore set forth, possessing the grouping

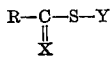

are decahydro beta naphthylamine, decahydro alpha naphthylamine, bornyl amine, methyl bornyl amine, ethyl bornyl amine, dibornyl amine, caryl amine, cyclohexyl ethyl amine, cyclohexyl methyl amine, 1-methyl-4-amino hexahydrobenzene, cyclohexyl amine and dicyclohexyl amine.

The compounds thus obtained are typical members of the new and preferred class of rubber vulcanization accelerators and are included within the scope of the present invention.

The following are to be understood as illustrative embodiments of the invention and not limitative of the scope thereof.

Example I

Substantially equi-molecular proportions of cyclohexyl amine and mercapto-benzo-thiazole were dissolved in boiling alcohol. After solution thereof was effected, the resulting solution was cooled and the cyclohexyl amine salt of mercapto-benzo-thiazole, which separated out, was filtered off and dried. The desired reaction product was obtained in high yield and in nature was a crystalline material melting at substantially 151–155° C. The product thus obtained was incorporated in the usual manner in a typical rubber gum stock comprising

| | Parts |
|---|---|
| Pale crepe rubber | 100 |
| Zinc oxide | 5 |
| Sulfur | 3 |
| Stearic acid | 1 |
| Accelerator | 0.25 |

The rubber stock thus compounded was vulcanized and the cured rubber product tested with the following results.

Table I

| Cure | | Modulus of elasticity in lbs./in.² at elongations of— | | | Tensile at break in lbs./in.² | Ult. elong. % |
|---|---|---|---|---|---|---|
| Mins. | Lbs. steam pressure | 300% | 500% | 700% | | |
| 30 | 20 | 158 | 311 | 1,075 | 2,810 | 875 |
| 45 | 20 | 197 | 431 | 1,695 | 3,590 | 835 |
| 60 | 20 | 246 | 530 | 2,360 | 4,000 | 800 |
| 30 | 30 | 221 | 471 | 1,895 | 3,485 | 810 |
| 45 | 30 | 236 | 518 | 2,225 | 3,620 | 795 |
| 60 | 30 | 282 | 572 | 2,280 | 3,700 | 795 |

From the data set forth in Table I, it is readily apparent that the new and preferred class of accelerators, for example the reaction product of cyclohexyl amine and mercapto-benzo-thiazole, are markedly strong in their accelerating effect, as 0.25% of accelerator based on the rubber content gives substantially as high a state of cure as 1% of most of the commercial accelerators.

The reaction product of cyclohexyl amine and mercapto-benzo-thiazole described above was also employed in a typical rubber tread stock comprising

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| Accelerator | 1 |

The rubber stock thus compounded was vulcanized and the cured rubber product tested with the results obtained as set forth in Table II.

Table II

| Cure | | Modulus of elasticity in lbs./in.$^2$ at elongations of— | | Tensile at break in lbs./in.$^2$ | Ult. elong. % |
|---|---|---|---|---|---|
| Mins. | Lbs. steam pressure | 300% | 500% | | |
| 60 | 30 | 2,710 | | 4,350 | 445 |
| 75 | 30 | 2,820 | | 4,500 | 450 |
| 90 | 30 | 2,740 | | 4,250 | 445 |
| 105 | 30 | 2,710 | | 4,200 | 430 |

The data set forth in Table II show that the new class of accelerators, for example the reaction product of cyclohexyl amine and mercapto-benzo-thiazole, is also markedly efficient in rubber tread stocks.

If desirable, the new and improved class of accelerators may be employed in conjunction with basic organic nitrogen containing accelerators. Thus, on employing the reaction product of cyclohexyl amine and mercapto-benzo-thiazole in conjunction with diphenyl guanidine, said reaction product is activated thereby and its accelerating action increased. Other basic organic nitrogen accelerators, as for example triphenyl guanidine and diortho tolyl guanidine, may be similarly employed.

*Example II*

The reaction product of substantially equi-molecular proportions of dicyclohexyl amine and mercapto-benzo-thiazole was prepared in a manner analogous to that employed in the preparation of Example I. The product so obtained was a pale yellow solid melting at 171–172° C. The reaction product of dicyclohexyl amine and mercapto-benzo-thiazole prepared as described above was incorporated in a rubber stock comprising

| | Parts |
|---|---|
| Pale crepe rubber | 100 |
| Zinc oxide | 5 |
| Sulphur | 3 |
| Stearic acid | 1 |
| Accelerator | 0.5 |

After vulcanizing, the cured rubber product was found to possess the following tensile and modulus characteristics.

Table III

| Cure | | Modulus of elasticity in lbs./in.$^2$ at elongations of— | | | Tensile at break in lbs./in.$^2$ | Ult. elong. % |
|---|---|---|---|---|---|---|
| Mins. | Lbs. steam pressure | 300% | 500% | 700% | | |
| 30 | 30 | 234 | 515 | 2,160 | 3,910 | 810 |
| 45 | 30 | 277 | 679 | 2,905 | 4,060 | 770 |
| 60 | 30 | 295 | 721 | 3,150 | 4,250 | 760 |

Other methods of preparing the preferred class of accelerators may be employed than that hereinbefore set forth. Thus the reactants, for example cyclohexyl amine and mercapto-benzo-thiazole, may be melted together in the absence of a solvent. Again they may be reacted in the presence of water with suitable agitation and grinding as shown in Example III.

*Example III*

Substantially one molecular proportion of a mixture of substantially 50% of cyclohexylamine and 50% of dicyclohexyl amine was reacted with substantially one molecular proportion of mercapto-benzo-thiazole by adding the above reactants to a suitable amount of water so as to form a paste and intimately mixing and grinding the mix by any convenient means, as for example by agitating in a ball mill. Some heat of reaction developed. It is preferred, however, to maintain the reaction temperature at substantially 40 to 45° C. in order to avoid loss of the amine during the reaction. After completion of the reaction, the resulting solid is preferably removed from the reaction mass, as for example by filtration, and dried. The dried crystalline product prepared as described, melted at substantially 135 to 140° C. The product prepared as described was incorporated in a gum stock comprising

| | Parts |
|---|---|
| Pale crepe rubber | 100 |
| Zinc oxide | 5 |
| Sulfur | 3 |
| Stearic acid | 1 |
| Accelerator | 0.5 |

The compounded rubber stock was then vulcanized and the cured rubber product found to possess the modulus and tensile characteristics given in Table IV.

Table IV

| Cure | | Modulus of elasticity in lbs./in.$^2$ at elongations of— | | | Tensile at break in lbs./in.$^2$ | Ult. elong. % |
|---|---|---|---|---|---|---|
| Mins. | Lbs. steam pressure | 300% | 500% | 700% | | |
| 30 | 30 | 322 | 893 | 3,740 | 4,310 | 730 |
| 45 | 30 | 365 | 909 | 3,700 | 4,455 | 745 |
| 60 | 30 | 355 | 915 | 3,720 | 4,360 | 730 |

*Example IV*

Substantially one molecular proportion of di[benzo-thiazyl]-disulfide and substantially two molecular proportions of cyclohexyl amine were allowed to react at room temperature. The heat of reaction caused a rise in temperature to substantially 60° C. Heating was continued for substantially one hour at substantially 60° C. The product thus formed was a hard grindable solid, which was incorporated in a rubber stock in the usual manner comprising

| | Parts |
|---|---|
| Pale crepe rubber | 100 |
| Zinc oxide | 5 |
| Sulfur | 3 |
| Stearic acid | 1 |
| The reaction product of dibenzo-thiazyl-disulfide and cyclohexyl amine | 0.5 |

The compounded rubber stock on vulcanizing and testing gave the following results.

Table V

| Cure | | Modulus of elasticity in lbs./in.² at elongations of— | | | Tensile at break in lbs./in.² | Ult. elong. % |
|---|---|---|---|---|---|---|
| Mins. | Lbs. steam pressure | 300% | 500% | 700% | | |
| 30 | 30 | 309 | 814 | 3,500 | 4,440 | 740 |
| 45 | 30 | 353 | 952 | 3,960 | 4,370 | 720 |
| 60 | 30 | 356 | 928 | 3,730 | 4,405 | 740 |

The compounded stock described above, wherein the reaction product of di[benzo-thiazyl]-disulfide and cyclohexylamine was employed as an accelerator, showed no "set up" or prevulcanization as determined by the Williams plastometer described by Williams, Industrial and Engineering Chemistry for 1924 (vol. 16, page 362—see also Krall, ibid, vol. 16, page 922) on heating for 120 minutes at 200° F.

*Example V*

Substantially one molecular proportion of tetramethyl thiuram disulfide and substantially two molecular proportions of cyclohexyl amine were allowed to react at room temperature. The heat of reaction caused a rise in temperature to substantially 50° C. After further heating at 60° C. to complete the reaction, the product was allowed to cool. The resulting product, comprising a yellow solid, was incorporated in a typical gum stock and found to possess the accelerating properties typical of the preferred class of new accelerators.

From the data hereinbefore set forth, it is readily apparent that the preferred class of vulcanization accelerators comprises a group of compounds that are particularly strong in their accelerating action properties and that the vulcanized rubber in which they are employed retains its desirable properties on continued vulcanization; that is to say it does not readily overcure. If it is desirable to further slow down the acceleration of the preferred class of accelerators, this may be accomplished by employing therewith certain retarding agents, as for example aniline acid phthalate and diphenyl guanidine phthalate. Aniline acid phthalate has the structural formula of

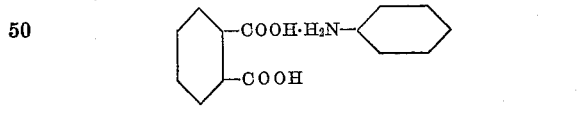

One method of its preparation comprises reacting substantially equi-molecular proportions of aniline hydrochloride and sodium acid phthalate in an aqueous solution, cooling the resulting solution and filtering. The solid thus separated, after washing with water, melted at substantially 154 to 155° C.

A rubber stock was compounded in the usual way comprising

| | Parts |
|---|---|
| Pale crepe rubber | 100 |
| Zinc oxide | 5 |
| Sulfur | 3 |
| Stearic acid | 1 |
| The reaction product of cyclohexyl amine and mercapto-benzo-thiazole | 0.15 |
| Diphenyl guanidine phthalate | 0.30 |

The compounded stock set forth above showed no "set up" or prevulcanization, as determined by the Williams plastometer described above on heating for 240 minutes at 200° F.

A rubber tread stock was compounded comprising

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| The reaction product of cyclohexyl amine and mercapto-benzo-thiazole | 0.5 |
| Aniline acid phthalate | 0.5 |

Plastometer tests carried out as above described showed no "set up" or prevulcanization on heating the compounded stock for 120 minutes at 200° F.

The reaction product of mercapto-benzo-thiazole and a mixture of 50% of cyclohexyl amine and 50% of dicyclohexyl amine has also been employed in typical gum and tread stocks in conjunction with aniline acid phthalate and diphenyl guanidine phthalate, and the rubber stock found on test to be free from scorching properties.

The present invention is limited solely by the following claims, wherein it is intended to claim the invention as broadly as possible.

What is claimed is:

1. The process of producing vulcanized rubber which comprises heating rubber and sulfur in the presence of a vulcanization accelerator comprising a reaction product of a saturated aromatic primary amine and a thiazyl disulfide.

2. The process of producing vulcanized rubber which comprises heating rubber and sulfur in the presence of a vulcanization accelerator comprising a reaction product of a saturated aromatic primary amine and an aryl thiazyl disulfide.

3. The process of producing vulcanized rubber which comprises heating rubber and sulfur in the presence of a vulcanization accelerator comprising a reaction product of a cyclohexyl primary amine and an aryl-thiazyl-disulfide.

4. The process of producing vulcanized rubber which comprises heating rubber and sulfur in the presence of a vulcanization accelerator comprising a reaction product of a cyclohexyl primary amine and a benzo-thiazyl-disulfide.

5. The process of producing vulcanized rubber which comprises heating rubber and sulfur in the presence of a vulcanization accelerator comprising a reaction product of substantially one molecular proportion of di[benzo-thiazyl] disulfide and substantially two molecular proportions of cyclohexyl amine.

6. The vulcanized rubber product produced by heating rubber and sulfur in the presence of a vulcanization accelerator comprising a reaction product of a saturated aromatic primary amine and a thiazyl disulfide.

7. The vulcanized rubber product produced by heating rubber and sulfur in the presence of a vulcanization accelerator comprising a reaction product of a saturated aromatic primary amine and an aryl thiazyl disulfide.

8. The vulcanized rubber product produced by heating rubber and sulfur in the presence of a vulcanization accelerator comprising a reaction product of a cyclohexyl primary amine and an aryl-thiazyl-disulfide.

9. The vulcanized rubber product produced by heating rubber and sulfur in the presence of a vulcanization accelerator comprising a reaction product of a cyclohexyl primary amine and a benzo-thiazyl-disulfide.

10. The vulcanized rubber product produced by heating rubber and sulfur in the presence of a vulcanization accelerator comprising a reaction product of substantially one molecular proportion of di[benzo-thiazyl] disulfide and substantially two molecular proportions of cyclohexyl amine.

11. The process of producing vulcanized rubber which comprises heating rubber and sulfur in the presence of a vulcanization accelerator comprising a reaction product of a cyclohexyl primary amine and a thiazyl disulfide.

12. The vulcanized rubber product produced by heating rubber and sulfur in the presence of a vulcanization accelerator comprising a reaction product of a cyclohexyl primary amine and a thiazyl disulfide.

MARION W. HARMAN.